United States Patent
Koh et al.

(10) Patent No.: US 10,490,853 B2
(45) Date of Patent: Nov. 26, 2019

(54) ELECTROLYTE FOR LITHIUM SECONDARY BATTERY AND LITHIUM SECONDARY BATTERY COMPRISING SAME

(71) Applicant: Samsung SDI Co., Ltd., Yongin-si, Gyeonggi-do (KR)

(72) Inventors: Joo Hwan Koh, Seoul (KR); Jong Ho Jeon, Daejeon (KR); Jin Hee Kim, Suwon-si (KR); Sung Nim Jo, Seoul (KR); Tae Hwan Yu, Seoul (KR); Jung Joo Cho, Hwaseong-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 229 days.

(21) Appl. No.: 15/538,949

(22) PCT Filed: Jul. 27, 2015

(86) PCT No.: PCT/KR2015/007784
§ 371 (c)(1),
(2) Date: Aug. 18, 2017

(87) PCT Pub. No.: WO2016/104901
PCT Pub. Date: Jun. 30, 2016

(65) Prior Publication Data
US 2017/0358826 A1 Dec. 14, 2017

(30) Foreign Application Priority Data
Dec. 22, 2014 (KR) .......... 10-2014-0185909

(51) Int. Cl.
*H01M 10/0567* (2010.01)
*H01M 10/0525* (2010.01)
(Continued)

(52) U.S. Cl.
CPC ..... *H01M 10/0567* (2013.01); *H01M 10/052* (2013.01); *H01M 10/0525* (2013.01);
(Continued)

(58) Field of Classification Search
CPC ............... H01M 6/16; H01M 10/0567; H01M 10/0525; H01M 10/0568; H01M 10/0569
See application file for complete search history.

(56) References Cited

U.S. PATENT DOCUMENTS

2003/0108800 A1 6/2003 Barbarich
2004/0002002 A1* 1/2004 Mizuta ................ H01G 9/035
429/188
(Continued)

FOREIGN PATENT DOCUMENTS

JP 2002-313415 A 10/2002
JP 2010-73647 A 4/2010
(Continued)

OTHER PUBLICATIONS

Crowhurst et al., "Ammonium Azide under High Pressure: A Combined Theoretical and Experimental Study", The Journal of Physical Chemistry, 118, P8695-8700. Sep. 16, 2014.*

*Primary Examiner* — Kenneth J Douyette
(74) *Attorney, Agent, or Firm* — Lewis Roca Rothgerber Christie LLP

(57) ABSTRACT

An electrolyte solution for a lithium secondary battery includes a lithium salt, an organic solvent, and a solid salt as an additive, the solid salt including at least one cation selected from ammonium-based cations and an azide anion ($N_3^-$). Using the electrolyte solution including the additive may provide a lithium secondary battery with improved high-temperature retention characteristics.

7 Claims, 1 Drawing Sheet

(51) Int. Cl.
*H01M 10/0568* (2010.01)
*H01M 10/052* (2010.01)
*H01M 10/0569* (2010.01)

(52) U.S. Cl.
CPC ... *H01M 10/0568* (2013.01); *H01M 10/0569* (2013.01); *H01M 2300/0025* (2013.01)

(56) References Cited

U.S. PATENT DOCUMENTS

2010/0209782 A1  8/2010  Choi et al.
2012/0082872 A1  4/2012  Schmidt et al.
2013/0323571 A1  12/2013  Dai et al.

FOREIGN PATENT DOCUMENTS

| KR | 10-2011-0025661 A | 3/2011 |
| KR | 10-1233829 B1 | 2/2013 |
| KR | 10-2013-0119431 A | 10/2013 |

* cited by examiner

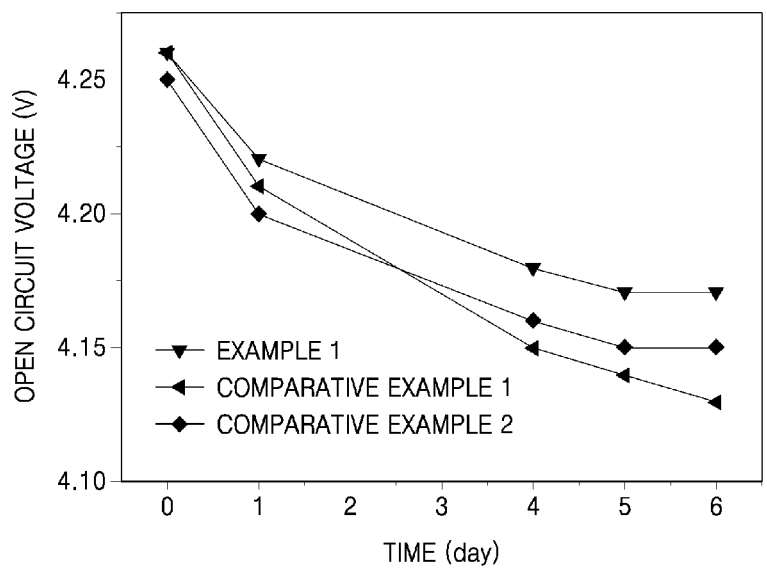

ELECTROLYTE FOR LITHIUM SECONDARY BATTERY AND LITHIUM SECONDARY BATTERY COMPRISING SAME

CROSS-REFERENCE TO RELATED APPLICATION(S)

This application is a National Phase Patent Application of International Patent Application Number PCT/KR2015/007784, filed on Jul. 27, 2015, which claims priority of Korean Patent Application 10-2014-0185909, filed Dec. 22, 2014. The entire contents of both of which are incorporated herein by reference.

TECHNICAL FIELD

The present disclosure relates to an electrolyte solution for a lithium secondary battery, and a lithium secondary battery including the electrolyte solution, and more particularly, to an electrolyte solution that may improve high-temperature retention characteristics of a lithium secondary battery, and a lithium secondary battery including the electrolyte solution.

BACKGROUND ART

Along with technical development and increasing demand for mobile devices, demand for secondary batteries as an energy source is rapidly increasing. In particular, currently lithium secondary batteries having high energy density, high working voltage, long cycle lifetime, and low self-discharge rate are widely commercially available.

Such a lithium secondary battery has a structure with an electrolyte assembly impregnated with an electrolyte solution containing a lithium salt, the electrolyte assembly including a positive electrode and a negative electrode that are obtained by coating electrode current collectors with respective positive and negative active materials and are separated from one another by a porous separator. During charging, lithium ions released from the positive active material are intercalated into a negative active material layer. During discharging, the lithium ions released from the negative active material layer are intercalated into the positive active material. The electrolyte solution serves as a migration medium of lithium ions between the negative electrode and the positive electrode.

In general, an electrolyte solution may include an organic solvent and an electrolyte salt. For example, a widely used electrolyte solution may consist of a mixed solvent of a high-dielectric cyclic carbonate such as propylene carbonate, or ethylene carbonate, and a low-viscosity chain carbonate such as diethylcarbonate, ethylmethylcarbonate, or dimethylcarbonate, and a lithium salt such as $LiPF_6$, $LiBF_4$, $LiClO_4$ added to the mixed solution.

Lithium-containing halide salts such as a lithium-containing fluoride salt or a lithium-containing chloride salt which may be used as the electrolyte salt are highly sensitive to moisture, generating a strong acid (HX, wherein X is F, Cl, Br, or I) by reaction with moisture during the manufacture of a battery or with moisture present in the battery. In particular, since $LiPF_6$ as a lithium salt is unstable at high temperature, its anions may be thermally decomposed, generating an acidic material such as hydrofluoric acid (HF). This acidic material may unavoidably accompany an undesirable side reaction within the battery.

For example, a solid electrolyte interphase (SEI) layer on a surface of the negative electrode may be vulnerable to damage due to strong reactivity of the hydrofluoric acid (HF), which may induce continuous regeneration of the SEI layer, and increase the thickness of the coated SEI layer of the negative electrode and an interfacial resistance of the negative electrode. As lithium fluoride (LiF) as a byproduct of the generation of hydrofluoric acid (HF) is adsorbed onto the surface of the positive electrode, an interfacial resistance of the positive electrode may also be increased. In addition, the strong acid (HX) may cause radical oxidation reaction within the battery, and consequently dissolution and degeneration of the electrode active materials. In particular, as transition metal cations included in a lithium metal oxide used as a positive active material are dissolved, the cations may be electrodeposited onto the negative electrode, forming an additional coating layer on the negative electrode, consequently further increasing the resistance of the negative electrode.

The SEI layer, which may be formed on the surface of the negative electrode by reaction of a polar non-aqueous carbonate solvent with lithium ions of the electrolyte solution during initial charging of a lithium secondary battery, may serve as a protective layer by inhibiting decomposition of the carbonate electrolyte solution to stabilize the battery. However, an SEI layer formed of only an organic solvent and a lithium salt may not be enough to consistently serve as a protective layer and thus may be gradually damaged during continuous charging and discharging of the battery or storage of the battery at high temperature in a fully charged state, due to increased electrochemical energy and heat energy. A side reaction of decomposing a surface of the negative active material exposed through the damaged SEI layer by reaction with the electrolyte solution solvent may continuously occur, leading to deterioration in characteristics of the battery, including capacity reduction, lifetime reduction, and resistance increase. Such a side reaction may generate gas in the battery. As such gas generation is continued, the internal pressure of the lithium secondary battery may be increased at high temperature, causing swelling of the battery with increased thickness and finally raising a safety concern of the battery.

To address these drawbacks, Patent document 1 (JP 2002-313415) discloses a non-aqueous electrolyte solution including about 0.5 wt % to about 1.5 wt % of biphenyl and 0.5 wt % to about 2.0 wt % of cyclohexyl benzene (CHB) as additives. According to this disclosure, swelling of a battery in a thickness direction may be reduced when the disclosed battery is left even at high temperature. A high-temperature characteristic test performed by measuring a thickness of the battery after it was maintained at a high temperature for 2 days supports that swelling of the battery in the thickness direction was slightly suppressed, but not any battery characteristic improvement effect. In particular, when the storage period at high temperature is continued for a longer time, battery capacity and capacity retention may be markedly reduced even with using the additives.

PRIOR ART DOCUMENT

Patent Document (Patent document 1) JP2002-313415 A

DETAILED DESCRIPTION OF THE INVENTION

Technical Problem

The present invention provides an electrolyte solution for a lithium secondary battery that includes a solid salt with an ammonium-based cation and an azide anion as an additive, thereby improving high-temperature storage characteristics.

The present invention provides a lithium secondary battery including the electrolyte solution.

Technical Solution

According to an aspect of the present invention, an electrolyte solution for a lithium secondary battery includes a lithium salt and an organic solvent, wherein the electrolyte solution further includes a solid salt with an ammonium-based cation represented by Formula 1 and an azide anion ($N_3-$):

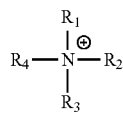

[Formula 1]

wherein, in Formula 1, $R_1$ to $R_4$ are each independently hydrogen, a halogen, or a C1 to C8 alkyl group.

In some embodiments, an amount of the solid salt may be in a range of about 0.01 part to about 5 parts by weight with respect to 100 parts by weight of a total weight of the lithium salt and the organic solvent. The solid salt may be at least one selected from the group consisting of ammonium azide, tetramethylammonium azide, tetraethylammonium azide, tetrapropylammonium azide, tetrabutylammonium azide, tetrahexylammonium azide, tetraheptylammonium azide, ethyltrimethylammonium azide, triethylmethylammonium azide, butyltrimethylammonium azide, diethyldimethylammonium azide, and dibutyldimethylammonium azide.

According to another aspect of the present invention, a lithium secondary battery includes the electrolyte solution.

Advantageous Effects of the Invention

As described above, according to the one or more embodiments, an electrolyte solution may further include a solid salt with an ammonium-based cation represented by Formula 1 and an azide anion as an additive. A lithium secondary battery including the electrolyte solution may have improved high-temperature storage characteristics. Therefore, the lithium secondary battery may have good capacity retention and discharge capacity even after high-temperature storage for a long time.

DESCRIPTION OF THE DRAWING

FIG. 1 is a graph of open circuit voltage with respect to high-temperature storage time in lithium secondary batteries manufactured using electrolyte solutions of Example 1, Comparative Example 1, and Comparative Example 2.

MODE OF THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

According to an aspect of the present disclosure, an electrolyte solution for a lithium secondary battery includes: a lithium salt and an organic solvent, wherein the electrolyte solution further includes a solid salt with an ammonium-based cation represented by Formula 1 and an azide anion ($N_3-$):

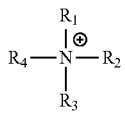

[Formula 1]

wherein, in Formula 1, $R_1$ to $R_4$ are each independently hydrogen, a halogen, or a C1 to C8 alkyl group.

In the electrolyte solution according to an embodiment, since the solid salt used as an additive has a lower reduction potential than a carbonate organic solvent of the electrolyte solution, the solid salt may be reduced at the surface of the negative active material layer earlier than the organic solvent of the electrolyte solution during initial charging of a battery, forming a strong, dense SEI layer. Accordingly, the SEI layer formed from the solid salt may prevent a side reaction such as co-intercalation of the organic solvent of the electrolyte solution into the negative active material layer or decomposition of the organic solvent on the surface of the negative electrode, thus improving lifetime characteristics of the battery. Furthermore, since the SEI layer is a passivation layer having low chemical reactivity, the SEI layer may exhibit high stability even during longer cycles, and provide long lifetime characteristics.

A conventional lithium secondary battery may undergo sudden performance deterioration in particular under high-temperature environments, due to radical collapse of the SEI layer on the surface of the negative electrode, consequently increased side reaction between the negative electrode and the electrolyte solution, increased generation of gas from decomposition reaction of the electrolyte solution, and increased thickness (resistance) of the negative electrode.

On the contrary, when the electrolyte solution according to an embodiment is used, the SEI layer collapsed at high temperature may be rapidly regenerated at a low potential due to the solid salt used as an additive and may be continuously maintained, reducing side reaction between the negative electrode having increased reactivity due to such as high temperature or the like, and providing improved general performance and high-temperature characteristics of the battery.

The amount of the solid salt may be from about 0.01 part to about 5.0 parts, and in some embodiments, about 0.1 part to about 3.0 parts by weight, with respect to 100 parts by weight of a total weight of the lithium salt and the organic solvent.

When the amount of the solid salt is less than 0.01 part by weight, it may be difficult to form a SEL layer having good stability. On the other hand, when the amount of the solid salt exceeds 5.0 parts by weight, charge and discharge efficiency may be reduced.

In some embodiments, the solid salt may be at least one selected from the group consisting of ammonium azide, tetramethylammonium azide, tetraethylammonium azide, tetrapropylammonium azide, tetrabutylammonium azide, tetrahexylammonium azide, tetraheptylammonium azide, ethyltrimethylammonium azide, triethylmethylammonium azide, butyltrimethylammonium azide, diethyldimethylammonium azide, and dibutyldimethylammonium azide. However, embodiments are not limited thereto.

In some embodiments, a concentration of the lithium salt in the electrolyte solution may be in a range of about 0.6M to about 2.0M, and in some embodiments, a range of about 0.7M to about 1.6M. When the concentration of the lithium salt is less than 0.6M, the electrolyte solution may have reduced conductivity and deteriorated performance. On the other hand, when the concentration of the lithium salt exceeds 2.0M, the electrolyte solution may have increased viscosity, consequently leading to reduced mobility of lithium ions. Any lithium salt commonly used in an electrolyte solution for a lithium secondary battery may be used. For example, anions of the lithium salt may be one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent in the electrolyte solution may be any organic solvent commonly used in an electrolyte solution for a lithium secondary battery. For example, the organic solvent may be an ether, an ester, an amide, a linear carbonate, or a cyclic carbonate, which may be used alone or a combination of at least two thereof.

Of these organic solvents, a cyclic carbonate, a linear carbonate, or a carbonate compound as a mixture of the forgoing two may be used. For example, the cyclic carbonate compound may be one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof, or a mixture of at least two thereof. For example, the linear carbonate compound may be one selected from the group consisting of dimethyl carbonate (DMC), diethyl carbonate (DEC), dipropyl carbonate, ethylmethylcarbonate (EMC), methylpropyl carbonate, and ethylpropyl carbonate, or a mixture of at least two thereof. However, embodiments are not limited thereto.

In particular, as cyclic carbonate organic solvents, ethylene carbonate and propylene carbonate which have high viscosity and high dielectric constant to dissociate a lithium salt in electrolyte may be used. For example, an electrolyte solution having a high electric conductivity prepared by mixing such a cyclic carbonate with a linear carbonate having low viscosity and low dielectric constant in an appropriate ratio may be used.

The ether as an organic solvent may be one selected from the group consisting of dimethyl ether, diethyl ether, dipropyl ether, methylethyl ether, methylpropyl ether, and ethylpropyl ether, or a mixture of at least two thereof. However, embodiments are not limited thereto.

The ester as an organic solvent may be one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or a mixture of at least two thereof. However, embodiments are not limited thereto.

In some embodiments, the electrolyte solution for a lithium secondary battery may further include a conventionally known additive to form an SEI layer. For example, the additive to form an SEI layer may be vinylene carbonate, vinyl ethylene carbonate, fluoroethylene carbonate, a cyclic sulfite, a saturated sultone, a unsaturated sultone, or a noncyclic sulfone, which may be used alone or in a combination of at least two thereof. However, embodiments are not limited thereto.

The cyclic sulfite may be, for example, ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, or 1,3-butylene glycol sulfite. The saturated sultone may be, for example, 1,3-propane sultone, 1,4-butane sultone, or the like. The unsaturated sultone may be, for example, ethene sultone, 1,3-propene sultone, 1,4-butene sultone, or 1-methyl-1,3-propene sultone. The noncyclic sulfone may be, for example, divinylsulfone, dimethyl sulfone, diethyl sulfone, methylethyl sulfone, or methylvinyl sulfone.

The additive to form an SEI layer may be used in an appropriate amount, which may vary depending on a type of the additive. For example, the additive to form an SEI layer may be about 0.01 part to about 10 parts by weight with respect to 100 parts by weight of the electrolyte solution.

According to another aspect of the present disclosure, a lithium secondary battery includes an electrolyte solution according to any of the above-described embodiments.

The lithium secondary battery may be manufactured by injecting an electrolyte solution according to any of the above-described embodiments into an electrode assembly including a positive electrode, a negative electrode, and a separator between the positive electrode and the negative electrode.

The positive electrode and the negative electrode may each be manufactured by preparing a slurry by mixing positive or negative active material, a binder, and a conducting agent, coating a current collector such as aluminum foil with the slurry, and drying and pressing a resulting product.

The positive active material may be a lithium-containing transition metal oxide, for example, one selected from the group consisting of $Li_xCoO_2$ (wherein $0.5<x<1.3$), $Li_xNiO_2$ (wherein $0.5<x<1.3$), $Li_xMnO_2$ (wherein $0.5<x<1.3$), $Li_xMn_2O_4$ (wherein $0.5<x<1.3$), $Li_x(Ni_aCo_bMn_c)O_2$ (wherein $0.5<x<1.3$, $0<a<1$, $0<b<1$, $0<c<1$, $a+b+c=1$), $Li_xNi_{1-y}Co_yO_2$ (wherein $0.5<x<1.3$, $0<y<1$), $Li_xCo_{1-y}Mn_yO_2$ (wherein $0.5<x<1.3$, $0\leq y\leq1$), $Li_xNi_{1-y}Mn_yO_2$ (wherein $0.5<x<1.3$, $0\leq y<1$), $Li_x(Ni_aCo_bMn_c)O_4$ (wherein $0.5<x<1.3$, $0<a<2$, $0<b<2$, $0<c<2$, $a+b+c=2$), $Li_xMn_{2-z}Ni_zO_4$ (wherein $0.5<x<1.3$, $0<z<2$), $Li_xMn_{2-z}Co_zO_4$ (wherein $0.5<x<1.3$, $0<z<2$), $Li_xCoPO_4$ (wherein $0.5<x<1.3$), and $Li_xFePO_4$ (wherein $0.5<x<1.3$), or a mixture of at least two thereof. The lithium-containing transition metal oxide may be coated with a metal such as aluminum (Al) or a metal oxide thereof. In addition to these lithium-containing transition metal oxides, a sulfide, a selenide, or a halide of metal may be used.

The negative active material may be, for example, a carbonaceous material, a lithium metal, silicon, or tin from which lithium, ions may generally intercalated and deintercalated. For example, the negative active material may be a metal oxide having a potential less than 2V with respect to lithium, such as $TiO_2$ or $SnO_2$. Examples of the carbonaceous material may include low-crystalline carbon and high-crystalline carbon. Examples of the low-crystalline carbon may include soft carbon and hard carbon. Examples of the high-crystalline carbon may include natural graphite, artificial graphite, Kishgraphite, pyrolytic carbon, mesophase pitch based carbon fiber, meso-carbon microbeads, mesophase pitches, and high-temperature sintered carbon such as petroleum or coal tar pitch derived cokes.

The binder attaches the active material to the conducting agent and fixes them on a current collector. The binder may include binders generally used in a lithium ion secondary battery. Examples of the binder are polyvinylidene fluoride, polypropylene, carboxymethyl cellulose (CMC), polyvinylpyrrolidone, tetrafluoroethylene, polyethylene, polyvinyl alcohol, and styrene-butadiene rubber.

The conducting agent may be, for example, artificial graphite, natural graphite, acetylene black, ketjen black, channel black, lamp black, thermal black, conductive fiber such as carbon fiber or metallic fiber, conductive metal oxides such as titanium oxide, and metallic powder such as aluminum powder or nickel powder.

Examples of the separator are a single olefin such as polyethylene (PE) and polypropylene (PP), or an olefin composite thereof, polyamide (PA), polyacrylonitrile (PAN), polyethylene oxide (PEO), polypropylene oxide (PPO), polyethylene glycoldiacrylate (PEGA), polytetrafluoroethylene (PTFE), polyvinylidene fluoride (PVdF), and polyvinylchloride (PVC).

The lithium secondary battery according to an embodiment may have any shape not limited to a specific shape. For example, the lithium secondary battery may be a cylindrical (can) type, a rectangular type, a pouch type, or a coin type.

One or more embodiments of the present disclosure will now be described in detail with reference to the following examples. However, these examples are only for illustrative purposes and are not intended to limit the scope of the one or more embodiments of the present disclosure.

<Preparation of Electrolyte Solution>

EXAMPLE 1

Ethylene carbonate, diethylcarbonate, and dimethylcarbonate were mixed in a volume ratio of about 2:4:4 to prepare an organic solvent. Next, $LiPF_6$ as a lithium salt was dissolved in the organic solvent to obtain a 1.15M $LiPF_6$ mixture solution. Next, 0.5 parts by weight of vinylene carbonate and 0.5 parts by weight of tetrabutylammonium azide as a solid salt, with respect to 100 parts by weight of the $LiPF_6$ mixture solution, were added, thereby preparing an electrolyte solution.

COMPARATIVE EXAMPLE 1

An electrolyte solution was prepared in the same manner as in Example 1, except that no solid salt was added.

COMPARATIVE EXAMPLE 2

An electrolyte solution was prepared in the same manner as in Example 1, except that 1.0 part by weight of lithium difluorophosphate was added, instead of 0.5 parts by weight of tetrabutylammonium azide.

<Manufacture of Battery>

$LiNi_{1/3}Co_{1/3}Mn_{1/3}O_2$ as a positive active material, polyvinylidene fluoride (PVdF) as a binder, and carbon black as a conducting agent were mixed in a weight ratio of about 91.5:4.4:4.1, and then dispersed in N-methyl-2-pyrrolidone to prepare positive active material slurry. This slurry was coated on an aluminum current collector, dried, and rollpressed to manufacture a positive electrode.

Graphite having a thickness of about 1 mm was used as a negative electrode.

Next, the manufactured positive electrode, the negative electrode, and a porous polyethylene membrane (available from Tonen) as a separator were assembled into a coin cell, and a corresponding electrolyte solution prepared as above was injected thereinto.

<Evaluation Method>

1. Cell Formation

The coin cells prepared by using the electrolytes of Example 1 and Comparative Example 1 were left at a constant temperature of 25° C. for 12 hours, charged under conditions including a constant current of 0.1 C until a voltage was 4.3 V and a constant voltage having a cutoff current of about 0.05 C, and discharged under conditions including a constant current of about 0.1 C until a voltage was 3.0 V by using a lithium secondary battery charger/discharger (TOSCAT-3600, available from Toyo-System Co., LTD), thereby completing a cell formation process.

2. Lifetime Characteristics

After the cell formation, an initial discharge capacity (A1) of each cell was measured after charging at room temperature (25° C.) with a constant current of about 0.2 C until a voltage of about 4.3V was reached, and then with a constant voltage with a cutoff voltage of about 0.05 C, and discharging with a current of about 0.2 C until a voltage of 3.0V was reached.

3. High-temperature Storage Characteristics

To evaluate high-temperature storage characteristics at a fully charged state of about 4.3V, each cell after the initial discharge capacity (A1) measurement was charged with a constant current of about 0.2 C until a voltage of 4.3V was reached and then with the constant voltage with a cutoff current of about 0.05 C.

Each cell fully charged with 4.3V was maintained at about 60° C. for about 6 days, and variations in open circuit voltage (OCV) with respect to days of storage were measured. The results are shown in FIG. 1. The OCV was measured after the cell temperature was sufficiently cooled down.

To compare capacity reduction caused by high-temperature storage, after each cell maintained at high temperature (60° C.) for 6 days was discharged at room temperature (25° C.) with a constant current of about 0.2 C until a voltage of 3.0V was reached, a discharge capacity (A2) was measured. A capacity retention was calculated using the following equation. The results are shown in Table 1.

Capacity retention [%]=(Discharge capacity (A2) after storage at 60° C. for 6 days/Initial discharge capacity (A1))×100

Next, to evaluate a capacity recovery of each cell, the cell after the discharge capacity measurement was recharged with a constant current of 0.2 C until a voltage of 4.3V was reached and with a constant voltage with a cutoff voltage of about 3.0V, and then a discharge capacity (A3) of the cell was measured. A capacity recovery was calculated using the following equation. The results are shown in Table 1.

Recovery [%]=[Discharge capacity (A3) of cell recharged after high-temperature storage/Initial discharge capacity (A1)]×100

TABLE 1

| | Before high-temperature storage | After high-temperature storage (60° C.) | | | | |
|---|---|---|---|---|---|---|
| | | Capacity retention | | Capacity recovery | | |
| Example | Initial discharge capacity (A1) (mAh/g) | Discharge capacity (A2) (mAh/g) | Retention (%) | Charge capacity (mAh/g) | Discharge capacity (A3) (mAh/g) | Retention (%) |
| Example 1 | 160.02 | 126.1 | 78.8 | 138.4 | 140.7 | 87.9 |
| Comparative Example 1 | 152.04 | 100.8 | 66.3 | 115.6 | 118.7 | 78.1 |
| Comparative Example 2 | 153.43 | 111.0 | 72.3 | 124.9 | 127.2 | 82.9 |

Referring to Table 1, the coin cell manufactured using the electrolyte solution of Example 1 had a higher discharge capacity and a higher capacity recovery than those of the coin cells manufactured using the electrolyte solutions of Comparative Examples 1 and 2.

Referring to FIG. 1, the coin cell including the electrolyte solution of Example 1 was found to have a less reduction in OCV with respect to time, compared to the coin cells including the electrolyte solutions of Comparative Examples 1 and 2. The less reduction in OCV of the coin cell including the electrolyte solution of Example 1 is attributed to the formation of a more stable SEI layer due to the use of the additive, and effective suppression of side reaction even at high temperature between the electrolyte solution and lithium ions intercalated in the negative electrode.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. An electrolyte solution for a lithium secondary battery, the electrolyte solution comprising a lithium salt and an organic solvent,
wherein the electrolyte solution further comprises a solid salt with an ammonium-based cation represented by Formula 1 and an azide anion ($N_3$—):

[Formula 1]

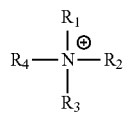

wherein, in Formula 1, $R_1$ to $R_4$ are each independently hydrogen, a halogen, or a C1 to C8 alkyl group.

2. The electrolyte solution of claim 1, wherein the solid salt is at least one selected from the group consisting of ammonium azide, tetramethylammonium azide, tetraethylammonium azide, tetrapropylammonium azide, tetrabutylammonium azide, tetrahexylammonium azide, tetraheptylammonium azide, ethyltrimethylammonium azide, triethylmethylammonium azide, butyltrimethylammonium azide, diethyldimethylammonium azide, and dibutyldimethylammonium azide.

3. The electrolyte solution of claim 1, wherein an amount of the solid salt is in a range of about 0.01 part to about 5 parts by weight with respect to 100 parts by weight of a total weight of the lithium salt and the organic solvent.

4. The electrolyte solution of claim 1, wherein the lithium salt comprises at least one anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

5. The electrolyte solution of claim 1, wherein the organic solvent is at least one selected from the group consisting of an ether, an ester, an amide, a linear carbonate, and a cyclic carbonate.

6. The electrolyte solution of claim 1, wherein the electrolyte solution comprises at least one selected from the group consisting of vinylene carbonate, vinyl ethylene carbonate, fluoroethylene carbonate, a cyclic sulfide, a saturated sultone, an unsaturated sultone, and a non-cyclic sulfone.

7. A lithium secondary battery comprising the electrolyte solution according to claim 1.

* * * * *